United States Patent
Hines

[19]

[11] Patent Number: 5,832,714
[45] Date of Patent: Nov. 10, 1998

[54] GAS TURBINE ENGINE HAVING FLAT RATED HORSEPOWER

[75] Inventor: William R. Hines, Cincinnati, Ohio

[73] Assignee: General Electric Company, Cincinnati, Ohio

[21] Appl. No.: 865,170

[22] Filed: May 29, 1997

Related U.S. Application Data

[62] Division of Ser. No. 561,657, Nov. 22, 1995, Pat. No. 5,768,884.

[51] Int. Cl.$^6$ .................................................. F02C 7/143
[52] U.S. Cl. ............................................................. 60/39.04
[58] Field of Search ........................... 60/39.03, 39.04, 60/39.161, 39.24, 39.25, 39.27, 39.29, 728

[56] References Cited

U.S. PATENT DOCUMENTS

| | | | |
|---|---|---|---|
| 2,625,012 | 1/1953 | Larrecq | 60/38.161 |
| 4,569,195 | 2/1986 | Johnson | 60/39.3 |
| 4,631,914 | 12/1986 | Hines | 60/39.05 |
| 4,660,376 | 4/1987 | Johnson | 60/39.05 |
| 4,714,032 | 12/1987 | Dickinson | 110/347 |
| 4,829,763 | 5/1989 | Rao | 60/39.05 |
| 4,896,499 | 1/1990 | Rice | 60/39.161 |
| 5,000,099 | 3/1991 | Dickinson | 110/238 |
| 5,050,375 | 9/1991 | Dickinson | 60/39.12 |
| 5,174,105 | 12/1992 | Hines | 60/39.04 |
| 5,261,225 | 11/1993 | Dickinson | 60/39.55 |
| 5,301,500 | 4/1994 | Hines | 60/39.161 |

FOREIGN PATENT DOCUMENTS

| | | | |
|---|---|---|---|
| 605502 | 6/1960 | Italy | 60/39.161 |

*Primary Examiner*—Louis J. Casaregola
*Attorney, Agent, or Firm*—Andrew C. Hess; David L. Narciso

[57] ABSTRACT

A gas turbine engine operable so that, in one embodiment, by adjusting the speed of an intercooler fan, the orientation of a variable inlet guide vane, and the orientation of a variable area turbine nozzle, the conditions at the inlet of the high pressure compressor are substantially the same for an ambient air temperature within the range of 59° F. and 100° F. The engine, in one embodiment, includes a low pressure compressor, a high pressure compressor, and an intercooler, including a fan, for cooling air output by the low pressure compressor and supplying the cooled air to the high pressure compressor.

7 Claims, 2 Drawing Sheets

GAS TURBINE ENGINE HAVING FLAT RATED HORSEPOWER

This application is a division of application Ser. No. 08/561,657, filed Nov. 22, 1995, now U.S. Pat. No. 5,768,884.

FIELD OF THE INVENTION

This invention relates generally to gas turbine engines and more particularly, to a gas turbine engine including an intercooler operable to provide flat rated horsepower.

BACKGROUND OF THE INVENTION

Gas turbine engines generally include a high pressure compressor for compressing air flowing through the engine, a combustor in which fuel is mixed with the compressed air and ignited to form a high energy gas stream, and a high pressure turbine. The high pressure compressor, combustor and high pressure turbine sometimes are collectively referred to as the core engine. Such gas turbine engines also may include a low pressure compressor, or booster, for supplying compressed air, for further compression, to the high pressure compressor.

Gas turbine engines are used in many applications, including in aircraft and in ships. The desired engine operating characteristics vary, of course, from application to application. More particularly, when the ambient temperature is lower, the core engine can operate to output a higher SHP without increasing the core engine temperature to unacceptably high levels. On a hotter day, however, the core engine temperature may rise to an unacceptably high level if a high SHP output is being delivered.

To satisfy the demand for an engine which can output a high SHP even when the engine ambient temperature is high, e.g., on hot days, inlet system evaporative coolers or refrigeration systems which reduce inlet air temperature typically are utilized. It also is known to use water spray fogging devices to inject water into either the booster or the compressor. Such coolers or other refrigeration systems are used on hot days to cool the air supplied to the core engine and enable increased horsepower output.

Although coolers, refrigeration systems and fogging devices are effective in facilitating high power output from a gas turbine engine on a hot day, these known systems and devices also typically require water pumps, pressurized air for aspiration, and other components which increase the engine cost, including maintenance cost. In addition, such systems and devices require water clean-up.

Moreover, known turbocooling systems have been used primarily to cool air in the engine high pressure turbine first stage nozzle vanes. Not all flow areas in the engine are cooled by known turbocooling systems. In addition, known turbocooling systems generally reduce engine performance, are complex and operate at high temperatures and pressures, e.g., 1100°–1300° F. and 400–600 PSIA.

It would be desirable to provide a gas turbine engine which is operable to output a high SHP even on hot days while the core engine operates at a level of low severity. It also would be desirable to provide such an engine which is not significantly more expensive, in both material and maintenance, than known engines, does not require water clean-up, and is relatively simple to operate.

SUMMARY OF THE INVENTION

These and other objects may be attained by a gas turbine engine which includes, in one embodiment, a high pressure compressor, a combustor, and a high pressure turbine, rotatable on a high pressure (HP) shaft and forming the core engine. The engine also includes a low pressure compressor, or booster, and a low pressure turbine, rotatable on a low pressure (LP) shaft. The booster includes variable inlet guide vanes (VIGVs) for controlling booster flow and pressure ratios.

The engine further includes an intercooler for cooling air output by the booster and supplying the cooled air to the high pressure compressor. The intercooler is sized to have a design point effectivity of approximately about 0.89 on a 100° F. day. The intercooler also is sized to handle engine flow, pressure and temperature parameters on a 59° F. day. The engine also includes, in one form, a free wheel turbine having variable area turbine nozzles (VATNs) including either a second or third stator vane row.

The above described engine is operable at a high SHP even on hot days while the core engine operates at a level of low severity. Specifically, as the ambient air temperature increases, the VATNs are adjustable to effect up to a +3.5% increased flow function value so that the low pressure rotor system may deliver a +3.9% ΔRPM increase from a 59° F. day to a 100° F. day. The VIGVs also may be adjusted to trim booster flow and pressure ratio. By operating the engine as described above, the high pressure compressor inlet temperature is maintained at about +130° F. when the ambient temperature is about 100° F. so that ambient air serves as a heat sink.

The engine described above is operable so that the conditions at the high pressure compressor inlet are substantially the same on both a 59° F. day and on a 100° F. day. As a result, even as ambient temperature climbs from 59° F. to 100° F., constant shaft horse power (SHP) can be maintained while the core engine gas generator operates at one single point of low severity.

The above described important operating result is provided without requiring refrigeration systems and fogging devices having water pumps and pressurized air for aspiration. Further, the intercooler operates at significantly lower temperatures and pressures than known turbocoolers, and enhances engine performance rather than reducing engine performance.

DETAILED DESCRIPTION OF THE DRAWINGS

Figure 1:
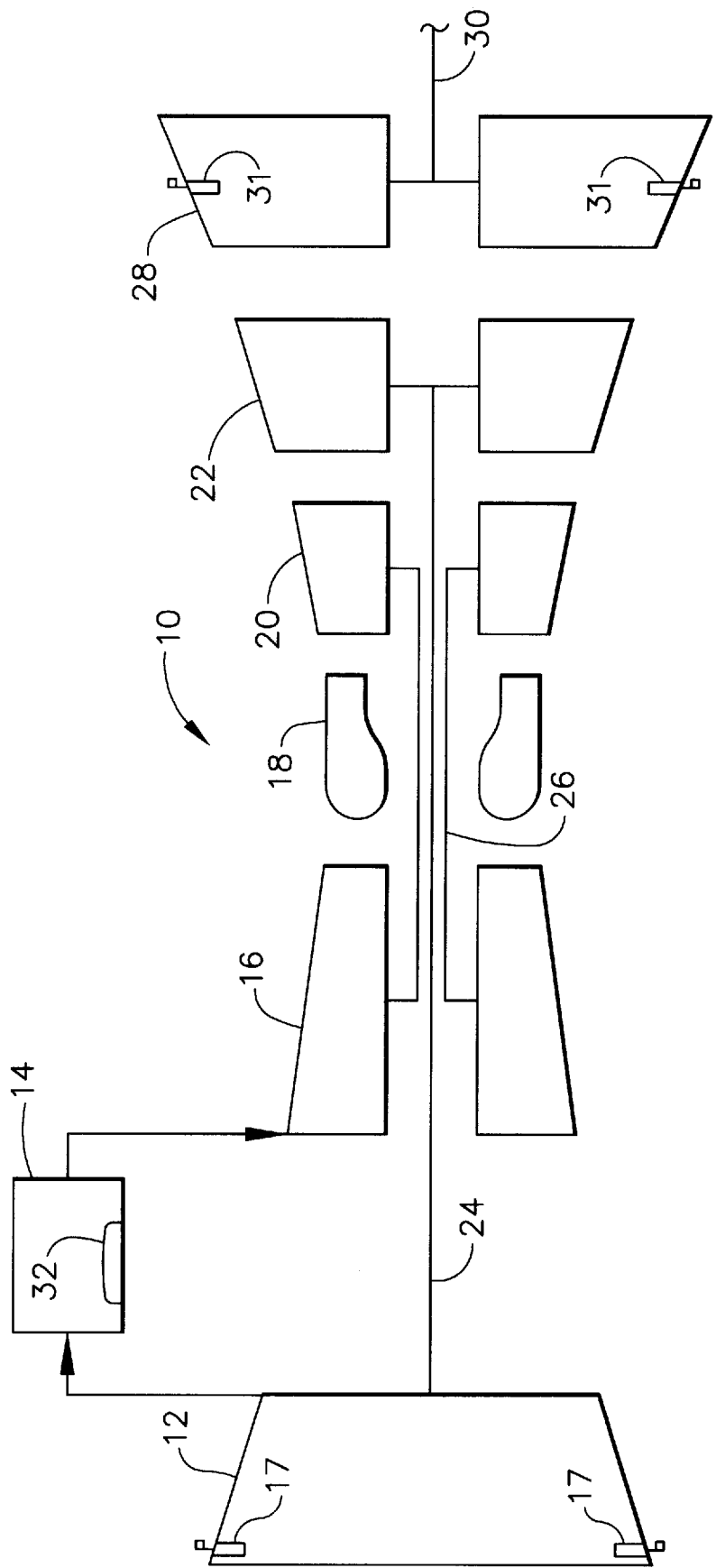
FIG. 1 is a schematic illustration of a gas turbine engine in accordance with one embodiment of the present inventions.

FIG. 1 illustrates, in schematic form, a gas turbine engine 10 in accordance with one embodiment of the present invention. Engine 10 may be particularly useful in industrial applications, such as to drive an electric generator. Engine 10, however, may be used in many other applications.

Referring specifically to FIG. 1, engine 10 includes a booster 12, an intercooler 14, and a high pressure compressor 16. Airflow from booster 12 to compressor 16 is directed through intercooler 14, which may, for example, be an air-to-air type intercooler. Booster 12 includes variable inlet guide vanes (VIGVs) 17 operable to trim booster flow and pressure ratio Engine 10 also includes a combustor 18, a high pressure turbine 20 and a low pressure turbine 22. Booster 12, sometimes referred to as a low pressure compressor, is coupled to low pressure turbine 22 by a first shaft, or low pressure rotor, 24. As explained hereinafter in more detail, the low pressure rotor system is configured to deliver a +3.88% ΔRPM increase from a 59° F. day to a 100° F. day. High pressure compressor 16 is coupled to high pressure turbine 20 by a second shaft, or high pressure rotor, 26.

A freewheel turbine 28 is coupled to a third shaft 30. As an example, third shaft 30 may be coupled to an electric generator. Freewheel turbine 28 has variable area turbine nozzles (VATNs) 31 including either a second or third stator vane row (not shown). The VATNS are adjustable to effect a +3.4% increased flow function value.

Each of the components of engine 10 described above are well known and commercially available. For example, such components are commercially available from General Electric Company, Cincinnati, Ohio.

Figure 2:
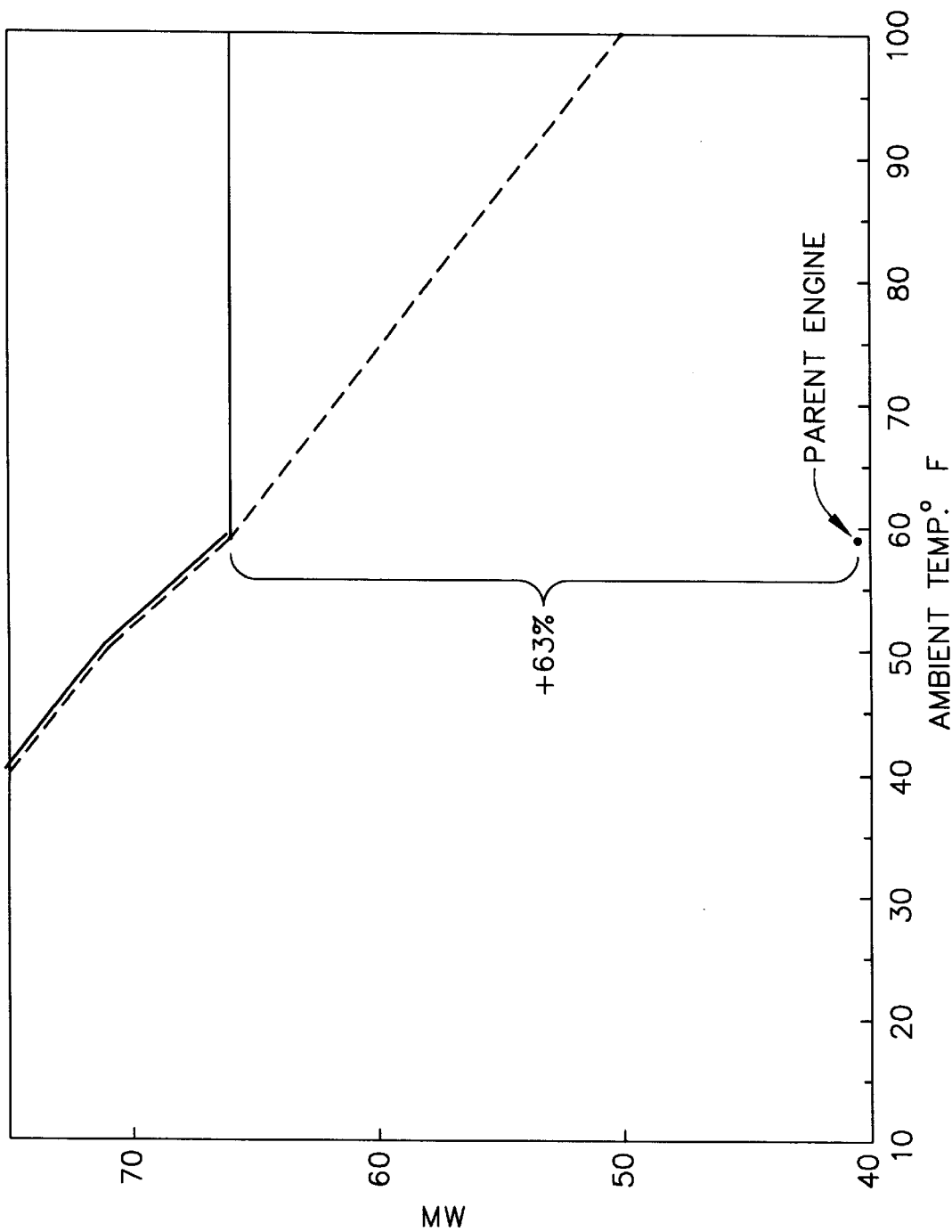
FIG. 2 is a chart illustrating output (MW) versus ambient temperature (°F.) for a known engine and an engine constructed and operated in accordance with the present invention.

FIG. 2 is a chart illustrating output (MW) versus temperature (°F.), and shows the overall expected SHP versus ambient temperature ratings for engine 10 (solid line) as compared to a typical gas turbine engine (dotted line). The chart shows that a +32% ΔSHP can be gained on a 100° F. day with engine 10 as compared to the typical engine without increasing the severity of operation between a 59° F. day and a 100° F. day, i.e., flat rated horsepower. Thus, intercooler 14 replaces heretofore used inlet coolers while simultaneously giving +63% growth on a 59° F. day.

The operation of engine 10 is described below in more detail and with specific values. These values are based on calculations made for an LM6000 gas turbine engine, which is commercially available from General Electric Company, modified to include an intercooler and a second or third stage row of VATNs.

More specifically, with respect to operation of engine 10 to achieve the benefits described above, as ambient temperature increases, booster rotor 24 physical speed increases as the power turbine flow function is increased +3.4% by opening up the VATNs. The intercooler fans 32 are sped up so that intercooler 14 can dump 19667 BTU/sec (+28%) of heat as compared to 15407 BTU/sec on a 59° F. day. As booster 12 moves from 367 lbs/sec of corrected inlet flow at 59° F. up to 381 lbs/sec corrected airflow on a 100° F. day, the VIGVs are opened about 7° on booster 12 to trim corrected airflow and pressure ratio at corrected speed. Typically, about 7°–10° opening of the VIGVs is required. Thus, by opening the VIGVs about 7° while increasing power turbine flow function about +3.4% and speeding up the intercooler cooling fans, as ambient temperature climbs from 59° F. to 100° F., constant SHP output is maintained while the core engine gas generator operates at approximately about the same point of low severity.

The above described engine, and method of operation, provide many advantages. For example, all components downstream of booster 12 remain at constant severity of operation except that the speed of LP rotor 24 increases +3.88% and except for a +9% power increase for low pressure turbine 22 to drive booster 12. This increases LP shaft 24 torque by +5.1% at 100° F. The intercooler fans remove about 15400 BTU/sec. of heat on a standard day as compared to 19700 BTU/sec. on a 100° F. day. Intercooler effectivity rises from 0.715 on a 59° F. day to 0.89 on a 100° F. day. The compressor inlet temperature air is about 129° F. on both days, giving a 30° F. differential on a 100° F. day. Further, engine 10 eliminates any needs for inlet flow field cooling which usually causes a total pressure loss, regardless of whether such cooling system is being used. Furthermore, ownership costs are believed to be reduced since the single vane state variability power turbine system is less expensive than large and costly inlet cooling systems.

Moreover, end users buying a given size engine 10 can meet hot day electricity demands with no lapse rate problem. Further, intercooler 14 reduces the temperature of all cooling flows, and intercooler 14 is a performance enhancer. Also, as the pressure (sometimes referred to as P3) at the outlet of compressor 16 increases to the above 400 PSIA, the simple cycle efficiency increases. Thus, engine 10 reaches 50% thermal efficiency using intercooler 14. Also, intercooler 14 runs at temperatures of 306°–360° F. and low pressures of 50 PSIA or thereabouts. Known turbocoolers, on the other hand, run at temperatures of 1100°–1300° F. and pressures of 400–600 PSIA or thereabouts.

Engine 10 described above could also be used as part of a combined cycle plant. The benefits of engine 10 described above would also be provided in such combined cycle operations.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, in an alternative configuration, intercooler 14 could be replaced with an organic closed cycle bottoming cycle cooler running off the heat removed from the booster discharge air. Accordingly, the spirit and scope of the invention are to be limited only by the terms of the appended claims.

What is claimed is:

1. A method for operating a gas turbine engine having a low pressure compressor including at least one variable inlet guide vane operable to adjust air flow therethrough, a high pressure compressor, a cooler including a cooling fan having multiple cooling rates for cooling air output by the low pressure compressor and supplying the cooled air to the high pressure compressor, a combustor located substantially adjacent an output of the high pressure compressor, a high pressure turbine located substantially adjacent an output of the combustor, the high pressure turbine coupled to the high pressure compressor by a high pressure rotor shaft, a low pressure turbine located substantially adjacent an output of the high pressure turbine, the low pressure turbine coupled to the low pressure compressor by a low pressure rotor shaft, and a free wheel turbine having at least first, second and third stages located substantially adjacent an output of the low pressure turbine, the free wheel turbine including at least one variable area turbine nozzle in at least one of said second and third turbine stages operable to adjust flow through said high pressure turbine, said method comprising the steps of:

positioning the variable inlet guide vane and the variable area turbine nozzle to first positions, and selecting a first fan cooling rate for the cooler, when the ambient air temperature is a first temperature; and positioning the variable inlet guide vane and the variable area turbine nozzle to second positions, and selecting a second fan cooling rate for the cooler, when the ambient air temperature is a second temperature;

so that the conditions at the inlet of the high pressure compressor are substantially the same for the ambient air temperature within the range of and between the first and second temperatures.

2. A method in accordance with claim 1 wherein the first and second temperatures are 59° F. and 100° F., respectively.

3. A method in accordance with claim 1 wherein the position of the variable area turbine nozzle can be varied to effect approximately about a 3.4% increased flow through the high pressure turbine.

4. A method in accordance with claim 1 wherein the low pressure rotor shaft can be controlled to effect approximately about a 3.88% increase in the low pressure rotor shaft rotation per minute.

5. A method in accordance with claim 1 wherein the cooler is an intercooler having a design point effectivity of approximately about 0.89 at an ambient temperature of approximately about 100° F. and a design point effectivity of approximately about 0.715 at an ambient temperature of approximately about 59° F.

6. A method in accordance with claim 5 wherein the engine is operable so that as ambient temperature increases, low pressure compressor speed increases by orienting the variable inlet guide vane to a more open condition, the intercooler fan speed increases, and the variable area turbine nozzle is oriented in a more open condition.

7. A method in accordance with claim 1 wherein the inlet temperature of the high pressure compressor is approximately about 130° F. with an ambient temperature range of approximately about 59° F. to 100° F.

* * * * *